United States Patent [19]

Proudfit

[11] Patent Number: 5,314,187
[45] Date of Patent: May 24, 1994

[54] GOLF BALL WITH IMPROVED COVER

[75] Inventor: James R. Proudfit, Humboldt, Tenn.

[73] Assignee: Wilson Sporting Goods Co., Chicago, Ill.

[21] Appl. No.: 905,895

[22] Filed: Jun. 29, 1992

Related U.S. Application Data

[63] Continuation-in-part of Ser. No. 733,789, Jul. 26, 1991, abandoned.

[51] Int. Cl.$^5$ ............................................. A63B 37/12
[52] U.S. Cl. .................................. 273/235 R; 273/233;
273/218; 273/228; 273/DIG. 22; 525/193;
525/123; 525/236; 264/250
[58] Field of Search ................ 525/193, 123, 236;
273/235 R, 230, 218, 233

[56] References Cited

U.S. PATENT DOCUMENTS

| | | | |
|---|---|---|---|
| 3,264,272 | 8/1966 | Rees . | |
| 3,572,722 | 3/1971 | Harrison | 273/218 |
| 3,784,209 | 1/1974 | Berman | 273/218 |
| 4,065,537 | 12/1977 | Miller | 264/143 |
| 4,266,772 | 5/1981 | Martin | 273/218 |
| 4,431,193 | 2/1984 | Nesbitt | 273/235 R |
| 4,436,276 | 3/1984 | Donahue | 249/91 |
| 4,483,537 | 11/1984 | Hanada | 273/220 |
| 4,625,964 | 12/1986 | Yamada | 273/62 |
| 4,683,257 | 7/1987 | Kakiuchi | 524/432 |
| 4,688,801 | 8/1987 | Reiter | 273/218 |
| 4,690,981 | 9/1987 | Statz | 525/329.6 |
| 4,714,253 | 12/1987 | Nakahara | 273/228 |
| 4,715,607 | 12/1987 | Llort | 273/235 |
| 4,792,141 | 12/1988 | Llort | 273/235 |
| 4,848,770 | 7/1989 | Shama | 273/220 |
| 4,863,167 | 9/1989 | Matsuki | 273/62 |
| 4,884,814 | 12/1989 | Sullivan | 273/325 |
| 4,911,451 | 3/1990 | Sullivan | 273/235 R |
| 4,919,434 | 4/1990 | Saito | 273/235 R |
| 4,931,376 | 6/1990 | Ikematsu | 526/164 |
| 4,955,966 | 9/1990 | Yuki | 273/218 |
| 4,979,746 | 12/1990 | Gentiluomo | 273/220 |
| 4,984,803 | 1/1991 | Llort | 273/235 R |
| 5,002,281 | 3/1981 | Nakahara | 273/220 |
| 5,006,297 | 4/1991 | Brown | 264/234 |
| 5,072,944 | 12/1991 | Nakahara | 273/220 |
| 5,096,201 | 3/1992 | Egashira | 273/218 |
| 5,120,791 | 6/1992 | Sullivan | 525/196 |

FOREIGN PATENT DOCUMENTS

| | | |
|---|---|---|
| 31709 | 7/1981 | European Pat. Off. . |
| 422826 | 4/1991 | European Pat. Off. . |
| 8594434 | 5/1985 | Japan . |
| 8809461 | 1/1988 | Japan . |
| 2000965 | 4/1988 | Spain . |
| 815634 | 7/1959 | United Kingdom . |
| 1026254 | 4/1966 | United Kingdom . |
| 1345151 | 1/1974 | United Kingdom . |
| 2165045 | 3/1986 | United Kingdom . |
| 2182340 | 5/1987 | United Kingdom . |
| 2203655 | 10/1988 | United Kingdom . |
| 2205105 | 11/1988 | United Kingdom . |
| 2206889 | 1/1989 | United Kingdom . |
| 2230531 | 10/1990 | United Kingdom . |
| 2245580 | 1/1992 | United Kingdom . |

Primary Examiner—James J. Seidleck
Assistant Examiner—I. Zemel

[57] ABSTRACT

A golf ball includes a core and a cover which is formed from two separate inner and outer layers. The inner layer is molded over the core and is formed from ionomer resin. The outer layer is molded over the inner layer and is formed from a blend of natural or synthetic balata and a crosslinkable elastomer such as polybutadiene. The elastomer is thermally crosslinked with a metallic salt of an unsaturated fatty acid, such as zinc diacrylate, and a crosslinking initiator such as organic peroxide.

25 Claims, 3 Drawing Sheets

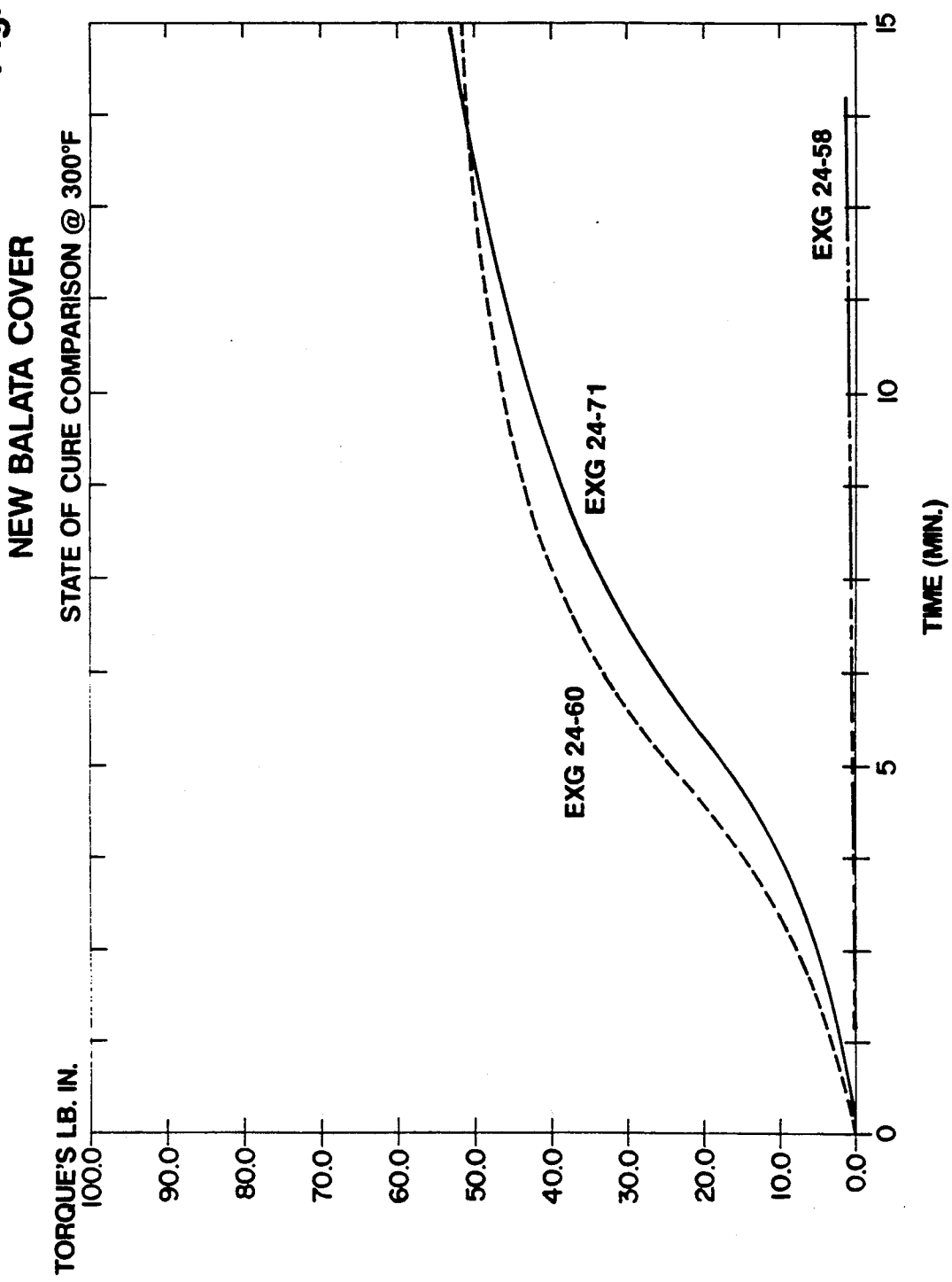

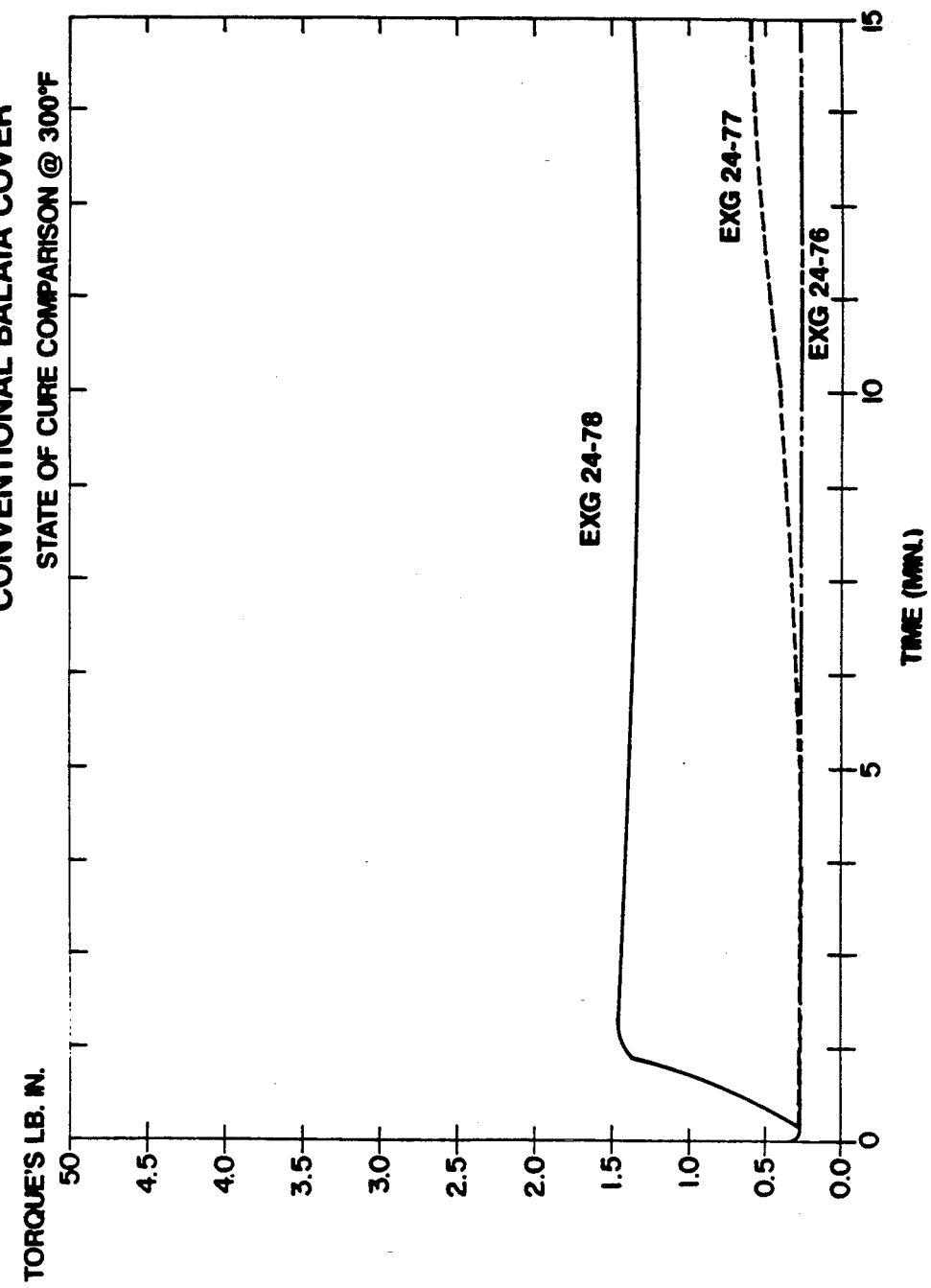

GOLF BALL WITH IMPROVED COVER

RELATED APPLICATION

This application is a continuation-in-part application of my co-pending application entitled "Golf Ball with Improved Cover," Ser. No. 733,789, filed Jul. 26, 1991, now abandoned.

BACKGROUND

This invention relates to golf balls, and, more particularly, to a golf ball having a two-layer cover. The inner layer is formed from hard resin material such as ionomer resin, and the outer layer is formed from soft material such as balata or a blend of balata and other elastomers.

Golf balls which are currently available fall into two general categories—balls which include a balata cover and balls which include a more durable, cut-resistant cover. Balata covers are made from natural balata, synthetic balata, or a blend of natural and synthetic balata. Natural rubber or other elastomers may also be included. Synthetic balata is trans polyisoprene and is commonly sold under the designation TP-301 available from Kuraray Isoprene Company Ltd.

Most cut-resistant covers utilize Surlyn ionomers, which are ionic copolymers available from E. I. du Pont de Nemours & Co. Surlyn ionomers are copolymers of olefin, typically ethylene, and an alpha-beta ethylenically unsaturated carboxylic acid, such as methacrylic acid. Neutralization of a number of the acid groups is effected with metal ions, such as sodium, zinc, lithium, and magnesium. DuPont's U.S. Pat. No. 3,264,272 describes procedures for manufacturing ionic copolymers. Ionic copolymers manufactured in accordance with U.S. Pat. No. 3,264,272 may have a flexural modulus of from about 14,000 to about 100,000 psi as measured in accordance with ASTM method D-790. DuPont's U.S. Pat. No. 4,690,981 describes ionic copolymers which include a softening comonomer. Ionic copolymers produced in accordance with U.S. Pat. No. 4,690,981 are considered "soft" ionic copolymers and have a flexural modulus of about 2800 to about 8500 psi.

Other cut-resistant materials which can be used in golf ball covers are ionic copolymers available from Exxon under the name Iotek, which are similar to Surlyn ionic copolymers except that acrylic acid is used rather than methacrylic acid.

A number of golfers, primarily professional and low handicap golfers, prefer balata covered balls because of the higher spin rate, control, "feel," and "click" which balata provides. "Feel" is the overall sensation imparted to a golfer when the ball is hit, and "click" refers to the sound made when the clubhead hits the ball. However, balata covered balls are more expensive and are less resistant to cutting than Surly covered balls.

Conventional balata covered 3 piece golf balls are produced by winding resilient, low heat-resistant elastic thread over a soft rubber or liquid rubber center, which must first be frozen to permit winding the rubber thread, and molding a conventional soft balata cover over the windings. The balata is conventionally vulcanized or crosslinked by using sulfur as the crosslinker or vulcanizing agent.

This process has proven to be very costly and requires numerous extra production steps in manufacture, extended cure time frames in hot room areas, and specified ambient conditions in order to complete the sulfur crosslinking system. The procedures limit the consistency of the crosslinking, reduce the ability to initiate good work-in-process production procedures and maintain normal inventory levels, and limit the time frame after ball finishing for final cover crosslinking which develops the final physical properties of the cover and the ball.

In addition, conventional processing methods for balata covered balls produce relatively low yields of good cosmetic quality balls because the additional processing steps which are required before complete cover crosslinking occurs can damage the cover surface. Also, extra steps are required in conventional balata ball production methods including chlorination and ball rinses to prepare the cover surface for acceptable paint adhesion to the balata surface. Multiple coats of pigmented paint are normally applied prior to logo stamping, then a final clear, two component or ultra violet curable coating is applied to protect the ball surface and logo.

While the ball is played, additional paint durability problems may be exhibited in the form of scuffing and micro cracking. Balata golf balls produced using the conventional process methods also suffer from color and color stability problems.

Surlyn covered balls are cheaper than balata balls not only because Surlyn is cheaper than balata but because the Surlyn balls can be processed after molding much easier and faster than balata balls. The substantial processing differences between balata balls and Surlyn balls can be see by comparing Tables 1 and 2, which describe the conventional processing steps for manufacturing 3 piece balata and 3 piece Surlyn golf balls. The term "3 piece" is commonly used to refer to a golf ball which has a center, a layer of elastic windings over the center, and a cover. The term "2 piece" is used to refer to a golf ball which has a solid core and a cover. Table 3 describes the conventional processing steps for a 2 piece Surlyn golf ball. The processing steps described in Tables 1-3 are well known in the golf ball industry, and a detailed description thereof is unnecessary.

TABLE 1

Conventional 3 Piece Balata Process 1. center rubber compound mixed
2. mill and preform pellets
3. mold center
4. center flash removed
5. freeze center
6. wind core (conventional elastic thread)
7. compression mold heated preform pellets into single halfshells
8. place halfshells over wound core
9. compression mold balata balls Note: cover is only partially crosslinked after this molding step.
10. freeze molded ball prior to buffing
11. remove balls and transfer to fiberglass bags
12. transport frozen balls to holding freezer
13. seam buff ball being careful not to buff seam too deep because of the soft cover
14. grade balls after seam buff for quality level
15. cure balata ball cover in alcohol/RR2 crystals solution, (7 hours soak)
16. remove balls from solution and water rinse
17. transport balls into hot room to cure for 7 days
18. before removing balls from room use benzene test method to insure proper cover cure 19. remove balls from cure room and soak in acetone, (hazard solvent disposal necessary)
20. remove balls from acetone and allow to air dry
21. chlorination process using hydrochloric acid and sodium hypochlorite; load balls into solution tank (must be done in an exhausted area for safety), (chlorination solution must be neutralized before discharge into city sewer drain)
22. remove balls and rinse in clear water tank, up and down motion
23. remove and repeat in second tank
24. remove and repeat in third tank
25. remove and rinse in acetone tank
26. apply primer
27. apply 1st top coat
28. pad print logo
29. apply clear top coat
30. inspect and package

TABLE 2

Conventional 3 Piece Surlyn Process 1. center rubber compound mixed
2. mill and preform slug
3. mold center
4. center flash removed
5. wind center (conventional elastic thread)
6. injection mold halfshells
7. place halfshells over core
8. compression mold ball
9. seam buff parting line
10. vibratory finish ball
11. apply primer
12. pad print logo
13. apply clear top coat
14. inspect and package

TABLE 3

Conventional 2 Piece Surlyn Process 1. core rubber compound mixed
2. mill and preform slug
3. mold core
4. centerless grind core to size
5. injection mold Surlyn cover around core
6. seam buff parting line
7. vibratory finish ball
8. apply primer
9. pad print logo
10. apply clear top coat
11. inspect and package The balata cover is not fully cured and crosslinked until the 7 day cure step of step No. 17 in Table 1 is completed. As a result, the partially cured balata balls require more careful handling and additional process steps than the Surlyn balls. For example, after the balata balls are removed from the mold they must be frozen before the parting line seam on each ball is buffed. Also, because the balata covers are softer, they must be examined more carefully for defects which could be caused by the processing steps.

DESCRIPTION OF PRIOR ART GOLF BALL CURING SYSTEMS

As stated previously, balata covers are generally vulcanized or cured using sulfur as the vulcanizing agent. Sulfur is included in the cover composition in an amount of about 1 to 2% by weight of the balata. The vulcanizing occurs during the final molding operation in which two hemispherical halfshells of the cover are molded over the thread-wound core in a compression mold. However, the molding temperature and time is limited by the threads, which can be damaged by high heat. Accordingly, the cover is not fully cured when it is removed from the mold and requires the exposure as described in Table 1, step 15 to accelerate the cure through migration of the RR2 crystals accelerator material into the cover cross sectional area to complete the vulcanization of the cover. RR2 crystals are the reaction product of 1,1 methylene dipiperdine and carbon disulfide and are available from Rockland React-Rite, Inc. of Rockmart, Ga. RR2 crystals are dissolved in isopropyl alcohol solvent in the amount of about 10% by weight of crystals to about 90% by weight of alcohol.

By way of example, one specific commercial balata covered ball which was sold by Wilson Sporting Goods Co. had the cover composition described in Table 4.

TABLE 4

| Prior Art Balata Cover Composition (Parts by Weight) | |
|---|---|
| Trans Polyisoprene | 84.00 |
| Natural Rubber or Polyisoprene | 16.00 |
| ZnO | 13.00 |
| TiO$_2$ | 17.00 |
| Blue Toner | 0.20 |
| Stearic Acid | 0.26 |
| Thiozole Accelerator | 0.26 |
| Sulfur | 1.20 |
| Total | 131.92 |

This system was not completely crosslinked until steps 15 through 17 were performed in Table 1.

The Zinc Oxide was used as a filler and a gravity adjuster. The blue toner was used to enhance the white color and was Ultramarine Blue from Whittaker, Clark & Daniels, Inc. of South Plainfield, N.J.

Two piece or solid golf balls conventionally include a core which includes a thermally crosslinkable elastomer such as polybutadiene. The polybutadiene is cured or crosslinked by including in the core composition a crosslinking agent and a crosslinking initiator. Common crosslinking agents are zinc salts of monocarboxylic acids such as zinc diacrylate, zinc acrylate, and zinc methacrylate. The crosslinking initiator provides free radicals, and common crosslinking initiators are organic peroxides such as dicumyl peroxide.

U.S. Pat. Nos. 3,784,209, 4,065,537, 4,266,772, 4,483,537, 4,683,257, 4,688,801, 4,714,253, and 4,715,607 describe various solid cores for golf balls which include elastomers such as polybutadiene which are cured or crosslinked by zinc diacrylate and peroxide or similar ingredients.

U.S. Pat. Nos. 4,792,141 and 4,931,376 describe golf ball covers which include blends of balata and elastomers such as polybutadiene and trans polyoctenylene rubber. However, the rubber compositions are cured by the conventional sulfur curing technique.

U.S. Pat. No. 4,884,814 describes a golf ball cover which is formed from a blend of "hard Surlyn" and "soft Surlyn". The hard Surlyn is described as a high modulus ionomer having a flexural modulus of from about 30,000 to 55,000 psi as measured in accordance with A.S.T.M. Method D-790. The soft Surlyn is described as a low modulus ionomer having a flexural modulus of from about 3,000 to about 7,000 psi.

U.S. Pat. No. 4,431,193 describes a golf ball with a two-layer cover. The inner layer is formed from a hard ionomer resin having a high flexural modulus, and the outer layer is formed from a soft ionomer resin having a low flexural modulus.

SUMMARY OF THE INVENTION

The invention provides a golf ball which has many of the desirable features of balata covered balls but is more durable, more cut-resistant, and easier and less expensive to manufacture than conventional balata covered balls.

A golf ball cover in accordance with the invention includes an inner layer formed from a relatively hard, cut-resistant material such as ionomer resin and an outer layer of soft material such as balata or a blend of balata and other elastomers. Preferably, the outer layer is a blend of balata and a thermally crosslinkable elastomer such as polybutadiene. The balata and elastomer are crosslinked during the molding of the ball by a crosslinker such as zinc diacrylate and a crosslinking initiator such as organic peroxide rather than using the conventional sulfur and RR2 crystals curing system for balata covers. The outer layer of the cover is completely crosslinked when the ball is removed from the mold, and subsequent processing steps can be performed in the same manner as on Surlyn covered balls. The inner layer of the cover provides good cut resistance, and the outer layer provides the sound, feel, and spin characterisics of a balata cover. The cover can be used in either 2 piece or 3 piece balls.

DESCRIPTION OF THE DRAWING

FIGS. 3 and 4 are rheology charts showing curing comparisons of various balata covers.

DESCRIPTION OF SPECIFIC EMBODIMENTS OF THE INVENTION

Figure 1:
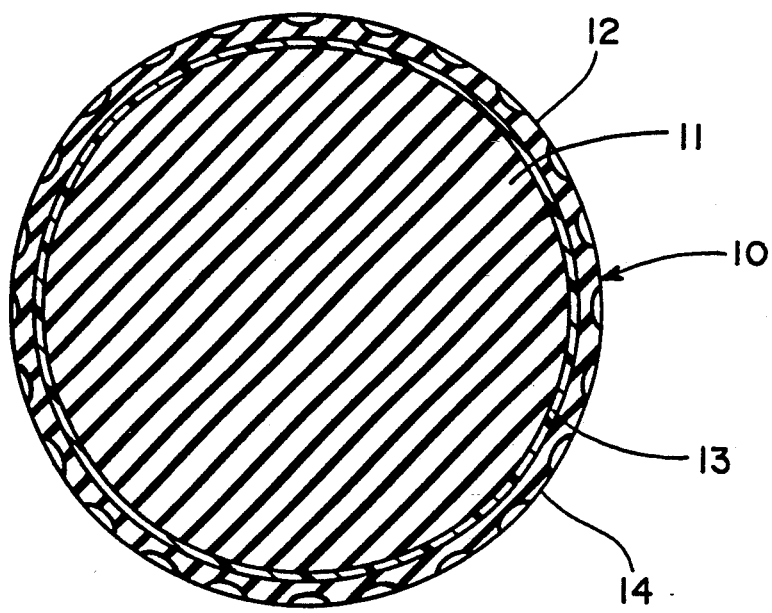
FIG. 1 is a cross section of a two piece ball formed in accordance with the invention.

The cover of the invention is formed from two layers —an inner layer which is molded over a solid or a wound core and an outer layer which is molded over the inner layer. The inner layer is formed from a relatively hard, cut-resistant material such as ionomer resin, and the outer layer is formed from relatively soft material such as elastomeric or polymeric material selected from the class consisting of natural balata, synthetic balata, natural rubber, polybutadiene, and polyoctenylene rubber. Polyoctenylene rubber having a high trans content is available under the trade name Vestenamer from Huls Corp. of West Germany. Particular grades of Vestenamer which are suitable are Vestenamer 8012 and Vestenamer 6213.

The ionomers used for the inner layer are available from E. I. du Pont de Nemours & Co. under the name Surlyn and from Exxon under the name Iotek. Surlyn resins are described in U.S. Pat. No. 3,264,272. As described in that patent, various metal ions can be used to neutralize the acid groups, including sodium, zinc, lithium, and magnesium. The ionomer resins generally fall into three categories which are characterized by hardness or stiffness—standard, high modulus, and low modulus. The standard resins have a flexural modulus in the range of about 30,000 to about 55,000 psi as measured by ASTM Method D-790. (Standard resins are referred to as "hard Surlyns" in U.S. Pat. No. 4,884,814.) The high modulus resins have a flexural modulus in the range of about 55,000 to about 100,000 psi. The low modulus resins have a flexural modulus in the range of about 2800 to about 8500 psi.

Specific standard Surlyn resins which can be used in the inner layer include 8940 (sodium), 9910 (zinc), 7930 (lithium). Specific standard Iotek resins which can be used include 8000 (sodium), 8020 (sodium), 8030 (sodium), 4000 (zinc), and 4010 (zinc.)

Low modulus ionomers are described in U.S. Pat. No. 4,690,981 and include a softening comonomer. Specific low modulus Surlyns which can be used in the inner layer include 8120 (sodium), 8320 (sodium), and 9320 (zinc).

Specific high modulus Surlyns which can be used in the inner layer include 8220 (sodium), 8240 (sodium), 9220 (zinc), and AD-8181 (lithium).

The ionomer resins can be used alone or in blends of two or more types of ionomers, for example, blends of sodium/zinc ionomers, sodium/lithium ionomers, zinc/lithium ionomers, and sodium/zinc/lithium ionomers. Blends of ionomers of different stiffness can also be used, for example, blends of standard/high modulus ionomers, standard/low modulus ionomers, low/high modulus ionomers, and low/standard/high modulus ionomers.

The relatively soft elastomeric material of the outer layer has a flexural modulus in the range of about 20,000 to 25,000 psi, and in one specific embodiment had a flexural modulus of from 22,165 to 22,379 psi.

The outer layer preferably comprises a blend of balata and one or more thermally crosslinkable elastomeric polymers. The balata can be either natural or synthetic balata or a blend of both. The thermally crosslinkable elastomers can be those which have heretofore been used in core compositions of golf balls, for example, as described in U.S. Pat. Nos. 3,784,209, 4,065,37, 4,266,772, 4,483,537, 4,683,257, 4,688,801, 4,714,253, and 4,715,607.

As described in those patents, suitable crosslinkable elastomers include homopolymers, copolymers or terpolymers of butadiene, isoprene or chloroprene. Preferably, the elastomer is 1,4 polybutadiene having a cis structure in a proportion of at least 40%. Most preferably the polybutadiene rubber contains at least 90% and even more preferably at least 95% of cis-1,4 bonds. If desired, natural rubbers, polyisoprene rubbers, styrene/butadiene rubbers, or the like may be blended with the polybutadiene rubber. Another suitable elastomer is polyoctenylene rubber having a high trans content.

The crosslinking agent can be one or more metalic salts of unsaturated fatty acids or monocarboxylic acids, particularly, zinc, calcium or magnesium salts of acrylic acid and methacrylic acid. Zinc diacrylate, zinc acrylate, and zinc methacrylate are particularly suitable.

Any of a number of known crosslinking initiators can be used. These initiators supply free radicals and include various organic peroxides such as dicumyl peroxide and n-Butyl-4, 4-bis (t-butylperoxy) valerate on calcium silicate, which is available from R. T. Vanderbilt, Inc. of Norwalk, Conn. under the trademark Varox 230XL. Suitable crosslinking agents and crosslinking initiators are described in the aforementioned patents which describe polybutadiene cores.

The balata is preferably present in a amount ranging from 25% to 99% of the total polymer content of the outer layer of the cover. The balance of the polymer content, namely from 75% to 1% of the total polymer content, is preferably provided by polybutadiene having a high cis-1,4 content, but other suitable crosslinkable elastomers such as natural rubber, Vestenamer, etc. can be blended with the polybutadiene as desired.

The amount of the crosslinking agent generally ranges from 20 to 50 parts by weight of the total polymer content of the outer layer, and is preferably about 35 to 45 parts by weight.

The amount of the crosslinker initiator can range from about ¾ to 3½ parts by weight of the total polymer content of the outer layer, and preferably is about 2 to 2½ parts by weight.

Any suitable filler, for example zinc oxide, can be added to both the inner and outer layers of the cover. Zinc oxide not only acts as a filler and as a gravity adjuster but may also provide crosslinking. Other conventional ingredients may also be included, such as titanium dioxide and Ultramarine Blue.

FIG. 1 illustrates a two-piece golf ball 10 which includes a solid core 11 and a cover 12 which comprises a relatively hard inner layer 13 of one or more ionomer resins and a relatively soft outer layer 14 of polymeric material. The solid core can be formed in the conventional manner.

Figure 2:
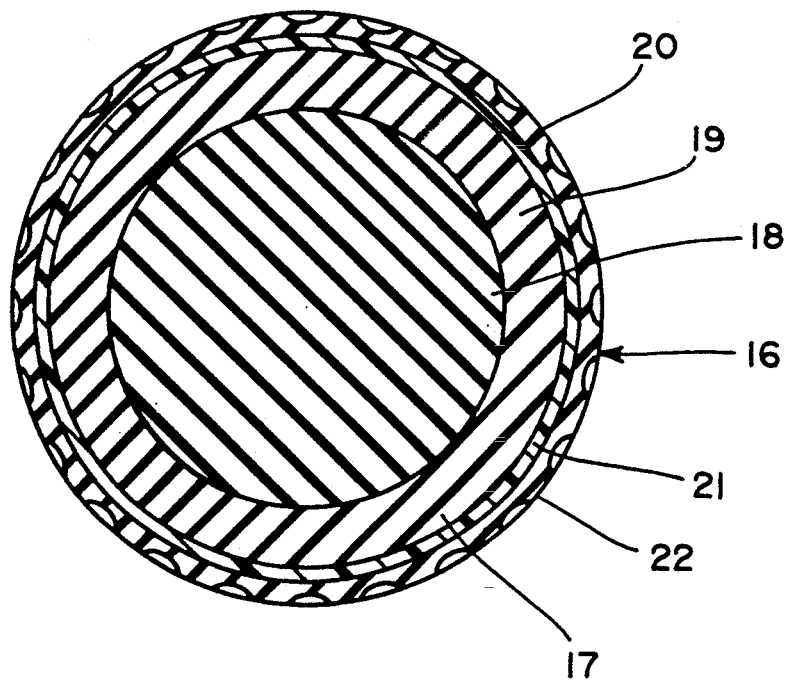
FIG. 2 is a cross section of a three piece ball formed in accordance with the invention.

FIG. 2 illustrates a three-piece golf ball 16 which includes a wound core 17 which comprises a center 18 and a layer 19 of windings of elastic thread. The center may be solid or a liquid filled balloon. Such wound cores are also conventional. A cover 20 includes a relatively hard inner layer 21 of one or more ionomer resins as previously described and a relatively soft outer layer 22 of polymeric material as previously described.

The diameter of the core of either the two-piece or the three-piece ball can be within the range of about 1.000 to 1.500 inch. The thickness of the inner layer can be within the range of about 0.0250 to 0.2875 inch to provide a total diameter of the inner layer and core within the range of about 1.550 to 1.590 inch. The thickness of the outer layer can be within the range of about 0.0450 to 0.0650 inch to provide a total ball diameter of 1.680 inch. The preferred dimensions are a core diameter of 1.500 inch, an inner layer thickness of 0.037 inch (inner layer diameter of 1.575 inch), and an outer layer thickness of 0.0525 inch (total ball diameter of 1.680 inch).

EXAMPLE I

Two specific solid core compositions used with the new two-layer cover had the composition described in Table 1. One core was used in a golf ball which was designated as a 90 compression ball, and the other core was used in a golf ball which was designated as a 100 compression ball.

TABLE 5

| | Composition of Core (Parts by Weight) | |
|---|---|---|
| | 90 Compression | 100 Compression |
| Polybutadiene Rubber | 95.00 | 95.00 |
| Vestenamer 8012 | 5.00 | 5.00 |
| Zinc Oxide | 12.20 | 11.10 |
| Zinc DiAcrylate | 35.00 | 38.00 |
| Antioxidant | 0.80 | 0.80 |
| Peroxide (Luperco 101 XL) | 0.80 | 0.80 |
| Liquid Monomer SR-351 (TMPTA) | 5.00 | 5.00 |

TABLE 5-continued

| | Composition of Core (Parts by Weight) | |
|---|---|---|
| | 90 Compression | 100 Compression |
| Total | 153.80 | 156.80 |

The antioxidant was 2,2'-Methylenebis (4-methyl-6-tertbutylphenol) which was obtained from R. T. Vanderbilt Co. of Norwalk, Conn. under the trade name Vanox MBPC.

The peroxide is an organic peroxide available from Atochem North America Inc., Philadelphia, Pa.

The Liquid Monomer is Trimethylolpropane Triacrylate available from Sartomer, Westchester, Pa.

The core was processed according to the conventional steps:
1. core rubber compound mixed
2. mill and preform slug
3. mold core
4. centerless grind core to size.

The composition of the inner layer of the cover is described in Table 6.

TABLE 6

| Composition of Inner Layer of Cover (Parts by Weight) | |
|---|---|
| Ionomer Type | Blend Ratio |
| Sodium- Surlyn 8940 | 75% |
| Zinc- Surlyn 9910 | 25% |

The inner layer can be molded in one of two methods:
1. Injection molded over the core in a manner which is conventionally used to injection mold ionomers over a solid core.
2. Injection mold halfshells, place halfshells over the core, compression mold the inner cover over the core.

After either method of molding the inner layer is completed, the surface is centerless ground to a preferred size of 1.575 inch in diameter prior to the final cover molding step.

The composition of the outer layer of the cover is described in Table 7.

TABLE 7

| Composition of Outer Layer (Parts by Weight) | |
|---|---|
| Trans PolyIsoprene (TP-301) | 60.00 |
| Polybutadiene | 40.00 |
| Zinc Oxide | 5.00 |
| Titanium DiOxide | 17.00 |
| Ultramarine Blue color | .50 |
| Zinc DiAcrylate | 35.00 |
| Peroxide (Varox 230 XL) | 2.50 |
| Total | 160.00 |

Ultramarine Blue is a blue toner which is used to enhance the white color of the cover and is available from Whittaker, Clark & Daniels, Inc. of South Plainfield, N.J.

The outer layer of the cover was made by conventional mixing and molding procedures. The components of the composition are mixed on a mill such as a two roll mill to form slabs. Slabs are fed into a dicer which cubes the cover compound prior to the injection molding to form generally hemispherical halfshells. The halfshells are placed about the inner layer of the ball in a compression molding machine which fuses the halfshells to each other and to the inner layer. The compression molding operation is carried out under a temperature of about 250° to 350° F. for about 5 to 10 minutes. The molding temperature causes the elastomer to crosslink, and it is believed that the ball is fully crosslinked when it is removed from the compression mold.

The outer layer composition can also be used in a conventional injection molding machine to form an injection molded outer layer about the inner layer.

The rheology chart of FIG. 3 shows that the crosslinking agent causes crosslinking of not only the polybutadiene but also of the balata and that the composition is fully crosslinked after the molding operation. The rheology chart was prepared by tests conducted on a Monsanto Moving Die Rheometer MDR 2000 available from Monsanto Instruments & Equipment of Akron, Ohio. The rheometer is used to measure cure characteristics of rubber and measures the reaction torque as a function of cure time or degree of vulcanization. Curing was performed at 300° F.

FIG. 3 compares the following outer layer compositions.

EXG24-60: from Table 8
EXG24-71: same as EXG24-60 but without polybutadiene (100% TP301)
EXG24-58: same as EXG24-60 but without polybutadiene and peroxide

TABLE 8

|  | EXG24-60 |
|---|---|
| Trans-Polyisoprene TP-301 | 84.00 |
| Polybutadiene | 16.00 |
| ZnO | 13.00 |
| ZDA | 35.00 |
| TiO2 | 17.00 |
| Ultramarine Blue | .50 |
| Peroxide (Varox 230XL) | 2.50 |
| Total | 168.00 |

EXG24-58 without peroxide exhibits very poor curing characteristics. The other two formulas have comparable curves, which indicate that the composition which includes balata and polybutadiene is just as crosslinkable as the composition which contains only balata and no polybutadiene.

FIG. 4 is a rheology chart which compares the three outer layer compositions set forth in Table 9:

TABLE 9

|  | EXG24-78 | EXG24-77 | EXG24-76 |
|---|---|---|---|
| Trans Polyisoprene | 84.00 | 84.00 | 84.00 |
| Natural Rubber | 16.00 | 16.00 | 16.00 |
| ZnO | 13.00 | 13.00 | 13.00 |
| TiO 2 | 17.00 | 17.00 | 17.00 |
| Ultramarine Blue | .20 | .20 | .20 |
| Stearic Acid | .26 | .26 | .26 |
| Thiozale Accelerator | .26 | .26 | .26 |
| Sulfur | 1.20 | 1.20 | — |
| RR-2 Crystals | 1.50 | — | — |
| Total | 133.42 | 131.92 | 130.72 |

Formula EXG24-78 is comparable to a conventional prior art balata cover which is cured by sulfur and the step of soaking the completed ball in an alcohol/RR2 crystal solution described in Step No. 15 of Table 1. However, in order to test the composition on the MDR 2000 Rheometer the RR2 crystals were incorporated into the composition to simulate the subsequent soaking step.

Formula EXG24-77 is the same as formula EXG24-78 but omits the RR2 crystals. Formula EXG24-76 is the same as formula EXG24-78 but omits both sulfur and the RR2 crystals.

It is significant to note the difference between the cure rheology of the balata compositions illustrated in FIG. 4 and the new balata compositions cured by zinc diacrylate and peroxide illustrated in FIG. 3. The rheology physical properties for the compositions in FIG. 4 are so low compared to the compositions of FIG. 3 that the scale of FIG. 4 had to be changed from 0 to 100 torque units to 0 to 5 torque units in order to be meaningful. The cover composition of formula EXG24-60 of FIG. 3 has significantly higher torque than formula EXG24-78 of FIG. 4. Also, the rheology cure curve for formula EXG24-78 shows reversion, while the cure curve of formula EXG24-60 shows essentially a curve which is flatlined.

Because the balata-containing outer layer of the cover in accordance with the invention is fully crosslinked after the molding operation, the golf balls can be processed in a manner in which is very similar to the processing of Surlyn covered balls, thereby greatly facilitating the additional processing steps and reducing the overall cost of the balls. The processing steps for 3 piece and 2 piece balls formed in accordance with the invention are described in Tables 10 and 11, and these processing steps can be compared with the steps described in Tables 1–3.

TABLE 10

New 3 Piece Process 1. center rubber compound mixed
2. mill and preform slug
3. mold center
4. center flash removed
5. wind center with heat resistant thread
6. injection mold halfshells for the inner layer of the cover
7. place the halfshells of the inner layer over the core
8. compression mold the halfshells of the inner layer over the core
9. grind inner cover surface to size if required
10. injection mold the halfshells of the outer layer
11. place the halfshells of the outer layer over the molded inner layer
12. compression mold ball
13. seam buff parting line
14. vibratory finish ball
15. apply primer
16. logo print
17. apply clear top coat
18. inspect and package

TABLE 11

New 2 Piece Process 1. core rubber compound mixed
2. mill and preform slug
3. mold core
4. centerless grind core to size
5. injection mold Surlyn inner layer of the cover around core or injection mold halfshells for the inner cover layer then compression mold halfshells around core
6. grind inner cover surface to size if required
7. injection mold halfshells of the outer layer of the cover
8. place halfshells of the outer layer over the molded inner layer 9. compression mold the halfshells of the outer layer over the inner layer
10. seam buff parting line
11. vibratory finish ball
12. apply primer
13. logo print
14. apply clear coat
15. audit inspect and package Note: The outer layer of the cover can also be injection molded over the inner layer using conventional injection molding technology.

Steps 5 and 10 through 25 in Table 1 have been eliminated using the new technology described in Tables 10 and 11. The 30 steps used to process balata covers in the old procedure have been replaced by 18 steps for 3 piece balls and 15 steps for 2 piece balls.

Balls formed in accordance with Example 1 (100 compression) were flight tested with an automatic hitting machine using a driver, a 5 iron, and a pitching wedge. The inventive balls were compared with Titleist Tour 100 balata balls, which is a popular balata covered 3 piece ball. The comparative flight test data is found in Table 12.

TABLE 12

|  | Carry | Difference | Total | Difference |
|---|---|---|---|---|
| HARD DRIVER- 7 Degree Launch Angle | | | | |
| Titleist Tour 100 Balata | 251.0 | Base | 268.7 | Base |
| Example 1 ball | 252.3 | +1.3 | 272.2 | +3.5 |
| HARD DRIVER- 9 Degree Launch Angle | | | | |
| Titleist Tour 100 Balata | 250.5 | Base | 258.7 | Base |
| Example 1 ball | 254.0 | +3.5 | 263.7 | +7.6 |
| HARD DRIVER- 11 Degree Lauch Angle | | | | |
| Titleist Tour 100 Balata | 249.6 | Base | 255.0 | Base |
| Example 1 ball | 255.0 | +5.3 | 262.6 | +7.6 |
| FIVE IRON | | | | |
| Titleist Tour 100 Balata | 166.6 | Base | 183.8 | Base |
| Example 1 ball | 167.1 | +0.5 | 182.0 | −1.8 |
| PITCHING WEDGE | | | | |
| Titleist Tour 100 Balata | 102.6 | Base | 107.9 | Base |
| Example 1 ball | 103.0 | +0.4 | 106.8 | −1.1 |

The comparative flight test data inventive ball is measurably longer than the Titleist Tour 100 ball off the hard driver at 7, 9, and 11 launch angles. Also, the inventive ball has parity holding with five iron and wedge shots.

Balls formed in accordance with Example 1 (100 compression) were subjected to the standard cut resistance test of Wilson Sporting Goods Co. The cut resistance test is conducted using a True Temper Driving Machine. The test club used is a pitching wedge. Six (6) balls of each type are tested and hit one time each approximately ¼ inch above the centerline of the ball (random orientation) at standard clubhead velocities. The golf balls are inspected and graded as follows:

| FACTOR | DESCRIPTION |
|---|---|
| 10 | No visible mark |
| 9 | Must search to find mark |
| 8 | Visible dent |
| 7 | Feel with fingernail- no cut |
| 6 | Fingernail inserts- cut |
| 5 | Fingernail inserts to core- core not visible |
| 4 | Core visible- core not cut |
| 3 | Core just cut |
| 2 | Core cut deep |
| 1 | Core destroyed |

The factors of the six (6) golf balls of each type are averaged to obtain an overall factor. The golf balls are evaluated by relative comparison with other golf balls of known cut resistance.

The inventive balls formed in accordance with Example 1 were compared to Titleist Tour 100 balata, Spalding Tour Edition 100 (Soft Ionomer cover), and Ultra (Hard Surlyn cover), the comparative cut resistance data is found in Table 13.

TABLE 13

| Ball I.D. | Cut Resistance Factor |
|---|---|
| Titleist Tour 100 balata | 4.8 |
| Spalding Tour Edition 100 | 6.2 |
| Ultra | 7.3 |
| Example 1 ball | 7.0 |

The data presented illustrates that the inventive ball is dramatically improved for cut resistance over the Titleist Tour 100 balata ball, marginally better than the Tour Edition ball, and nearly parity to the hard Surlyn Ultra ball.

While in the foregoing specification a detailed description of specific embodiments of the invention were set forth for the purpose of illustration, it will be understood that many of the details herein given may be varied considerably by those skilled in the art without departing from the spirit and scope of the invention.

I claim:

1. A golf ball comprising a core and a cover, the cover comprising an inner layer molded over the core and an outer layer molded over the inner layer, the inner layer comprising ionomer resin and the outer layer containing natural or synthetic balata as a principal ingredient.

2. The golf ball of claim 1 in which the outer layer includes a blend of natural or synthetic balata and polybutadiene.

3. The golf ball of claim 1 in which the outer layer includes natural or synthetic balata in an amount ranging from 25 to 99% of the total weight of polymer of the outer layer and a crosslinkable elastomer in an amount ranging form 1 to 75% of the total weight of polymer of the outer layer, said elastomer being selected from the group consisting of polyoctenylene; homopolymers, copolymers, or terpolymers of butadiene; and homopolymers, copolymers, or terpolymers of chloroprene.

4. The golf ball of claim 1 in which the diameter of the core is within the range of about 1.000 to 1.500 inch, the thickness of the inner layer is within the range of about 0.0250 to 0.2875 inch, the thickness of the outer layer is within the range of about 0.0450 to 0.650 inch, and the diameter of the golf ball is at least 1.680 inches.

5. The golf ball of claim 1 in which the diameter of the core is about 1.500 inch, the thickness of the inner layer is about 0.0375 inch, the thickness of the outer layer is about 0.0525 inch, and the diameter of the golf ball is 1.680 inches.

6. A golf bal comprising a core and a cover, the cover comprising an inner layer of ionomer resin molded over the core and an outer layer molded over the inner layer, the outer layer being formed from a composition comprising:
   a) natural or synthetic balata;
   b) an elastomer which is crosslinkable with a metallic salt of an unsaturated fatty acid, said elastomer being selected from the group consisting of polyoctenylene; homopolymers, copolymers, or terpolymers of butadiene; and homopolymers, copolymers or terpolymers of chloroprene;
   c) a metallic salt of an unsaturated fatty acid as a crosslinking agent; and
   d) a crosslinking initiator which provides a source of free radicals.

7. The golf ball of claim 6 in which the elastomer of the outer layer is selected from the group consisting of polybutadiene and polyoctenylene.

8. The golf ball of claim 6 in which the natural or synthetic balata of the outer layer is present in an amount ranging from 25 to 99% of the total weight of polymer of the outer layer and the crosslinkable elastomer is present in an amount ranging from 1 to 75% of the total rate of polymer of the outer layer.

9. The golf ball of claim 6 in which the crosslinking agent of the outer layer is selected from the group of zinc salts, calcium salts, and magnesium salts of monocarboxylic acids.

10. The golf ball of claim 6 in which the crosslinking initiator of the outer layer is organic peroxide.

11. The golf ball of claim 6 in which the core is a solid core.

12. The golf ball of claim 7 in which the core is a 2 piece core comprising a center and a layer of elastic windings over the center.

13. The golf ball of claim 6 in which the crosslinkable elastomer of the outer layer is polybutadiene.

14. The golf ball of claim 13 in which the polybutadiene is cis 1,4 polybutadiene having a cis content of at least 40%.

15. The golf ball of claim 6 in which the diameter of the core is within the range of about 1.000 to 1.500 inch, the thickness of the inner layer is within the range of about 0.0250 to 0.2875 inch, the thickness of the outer layer is within the range of about 0.0450 to 0.650 inch, and the diameter of the golf ball is at least 1.680 inches.

16. The golf ball of claim 6 in which the diameter of the core is about 1.500 inch, the thickness of the inner layer is about 0.0375 inch, the thickness of the outer layer is about 0.0525 inch, and the diameter of the golf ball is 1.680 inches.

17. A golf ball comprising a core and a cover, the cover comprising an inner layer of ionomer resin molded over the core and an outer layer molded over the inner layer, the outer layer being formed from a composition comprising:
   a) from 25 to 99 parts by weight of natural or synthetic balata;
   b) from 1 to 75 parts by weight of an elastomer which is crosslinkable with a metallic salt of an unsaturated fatty, acid, said elastomer being selected from the group consisting of polyoctenylene, homopolymers, copolymers, or terpolymers of butadiene; and homopolymers, copolymers, or terpolymers of chloroprene;
   c) from 20 to 50 parts by weight of a metallic salt of an unsaturated fatty acid as a crosslinking agent; and
   d) from ¾ to 3½ parts by weight of a crosslinking initiator which provides a source of free radicals.

18. The golf ball of claim 17 in which the crosslinkable elastomer of the outer layer, is polybutadiene.

19. The golf ball of claim 18 in which the polybutadiene is cis 1,4 polybutadiene having a cis content of at least 40%.

20. The golf ball of claim 17 in which the diameter of the core is within the range of about 1.000 to 1.500 inch, the thickness of the inner layer is within the range of about 0.0250 to 0.2875 inch, the thickness of the outer layer is within the range of about 0.0450 to 0.650 inch, and the diameter of the golf ball is at least 1.680 inches.

21. The golf ball of claim 17 in which the diameter of the core is about 1.500 inch, the thickness of the inner layer is about 0.0375 inch, the thickness of the outer layer is about 0.0525 inch, and the diameter of the golf ball is 1.680 inches.

22. A method of making a golf ball comprising the steps of:
   a) forming a spherical core;
   b) molding ionomer resin over the core to form a first cover layer;
   c) forming a blended composition of balata, crosslinkable elastomer, a metallic salt of an unsaturated fatty acid as a crosslinking agent, and a crosslinking initiator which provides a source of free radicals, said crosslinkable elastomer being selected from the group consisting of polyoctenylene, homopolymers, copolymers, or terpolymers of butadiene; and homopolymers, copolymers, and terpolymers of chloroprene; and
   d) molding said blended composition over the first cover layer to form a second cover layer and to crosslink the crosslinkable elastomer.

23. The golf ball obtained by the method of claim 22 in which the molding of the blended composition is performed under a temperature of about 250° to 350° F. for about 5 to 10 minutes.

24. The golf ball obtained by the method of claim 22 which the diameter of the core is within the range of about 1.000 to 1.500 inch, the first cover layer is molded to a thickness within the range of about 0.0250 to 0.2875 inch, and the second cover layer is molded to a thickness within the range of about 0.0450 to 0.650 inch.

25. The golf ball of claim 24 in which the diameter of the core is about 1.500 inch, the first cover layer is molded to a thickness of about 0.0375 inch, and the second cover layer is molded to a thickness of about 0.0525 inch.

* * * * *